United States Patent [19]

Warnan et al.

[11] Patent Number: 5,044,160
[45] Date of Patent: Sep. 3, 1991

[54] MECHANISM FOR OBTAINING A MOTION OF TRANSLATION IN A MARINE ENVIRONMENT

[75] Inventors: Francois Warnan, Rambouillet; Alain Penain, Paris, both of France

[73] Assignee: Thomson-CSF, Puteaux, France

[21] Appl. No.: 448,998

[22] Filed: Dec. 12, 1989

[30] Foreign Application Priority Data

Dec. 20, 1988 [FR] France ................. 88 16813

[51] Int. Cl.⁵ ............................................. F16D 31/02
[52] U.S. Cl. ...................................... 60/413; 60/478; 92/130 C
[58] Field of Search ................. 60/432, 433, 473, 474, 60/475, 478, 477, 369; 91/441, 454, 468, 462; 92/130 C

[56] References Cited

U.S. PATENT DOCUMENTS

| | | | |
|---|---|---|---|
| 919,853 | 3/1909 | Rowntree | 91/DIG. 2 X |
| 2,914,922 | 12/1959 | Gibson | 60/432 X |
| 3,002,564 | 10/1961 | Baker | 166/212 |
| 3,273,645 | 9/1966 | Der Mott | 166/55.1 |
| 3,402,553 | 9/1968 | Mercier | 91/462 |
| 3,440,825 | 4/1969 | Lloyd | 60/478 X |
| 3,524,386 | 8/1970 | Cudnohufsky | 91/468 |
| 3,572,032 | 3/1971 | Terry | 60/478 X |
| 3,828,556 | 8/1974 | Nolden | 60/432 |
| 4,054,155 | 10/1977 | Hill | 60/432 X |
| 4,247,077 | 1/1981 | Banick et al. | 60/477 X |
| 4,409,887 | 10/1983 | Shingu et al. | 91/DIG. 2 X |

FOREIGN PATENT DOCUMENTS

0218358 4/1987 European Pat. Off.
2518506 10/1976 Fed. Rep. of Germany.

Primary Examiner—Edward K. Look
Assistant Examiner—Todd Mattingly
Attorney, Agent, or Firm—Oblon, Spivak, McClelland, Maier & Neustadt

[57] ABSTRACT

The disclosed mechanism is designed so as to be impervious and give a motion of translation enabling, for example the driving of a hinged arm. The mechanism has a hydraulic circuit with fluid, a jack associated with a pull-back spring and a pump to bring the jack to the working position. The pump is actuated by a motor. The pump and the motor are entirely placed inside a common enclosure so that the motor, with its shaft, bathes in the fluid of the hydraulic circuit. The mechanism is designed for sonars, to unfold and fold their antennas mounted on hinged arms.

3 Claims, 3 Drawing Sheets

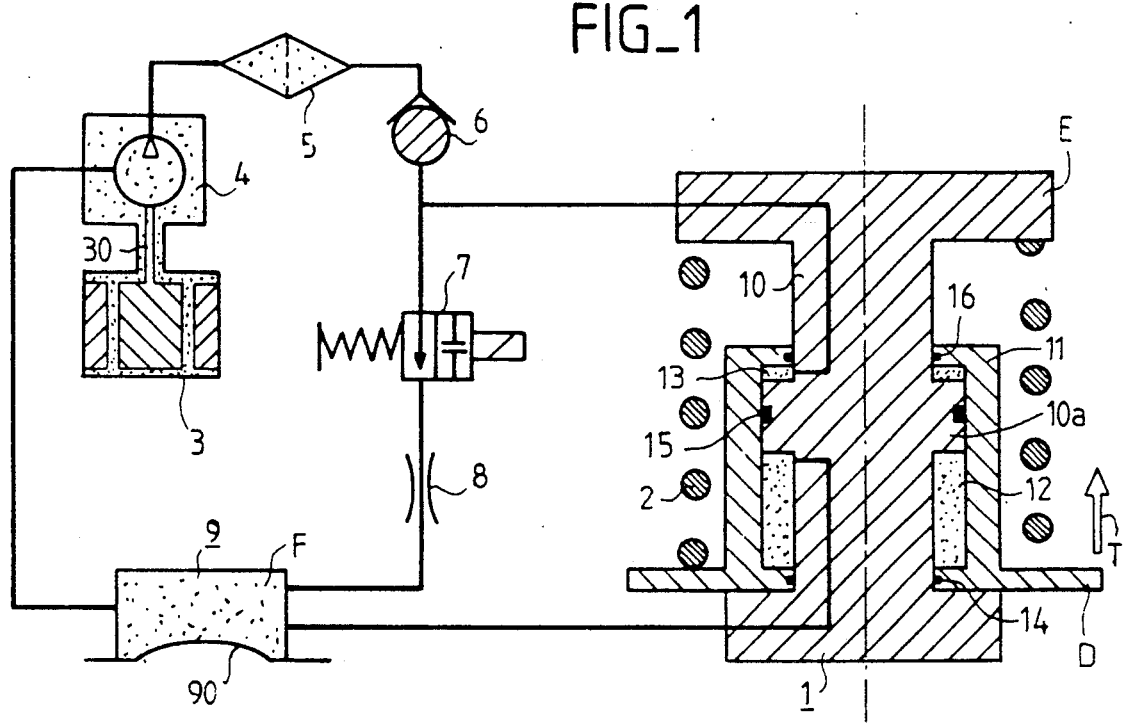
FIG_1
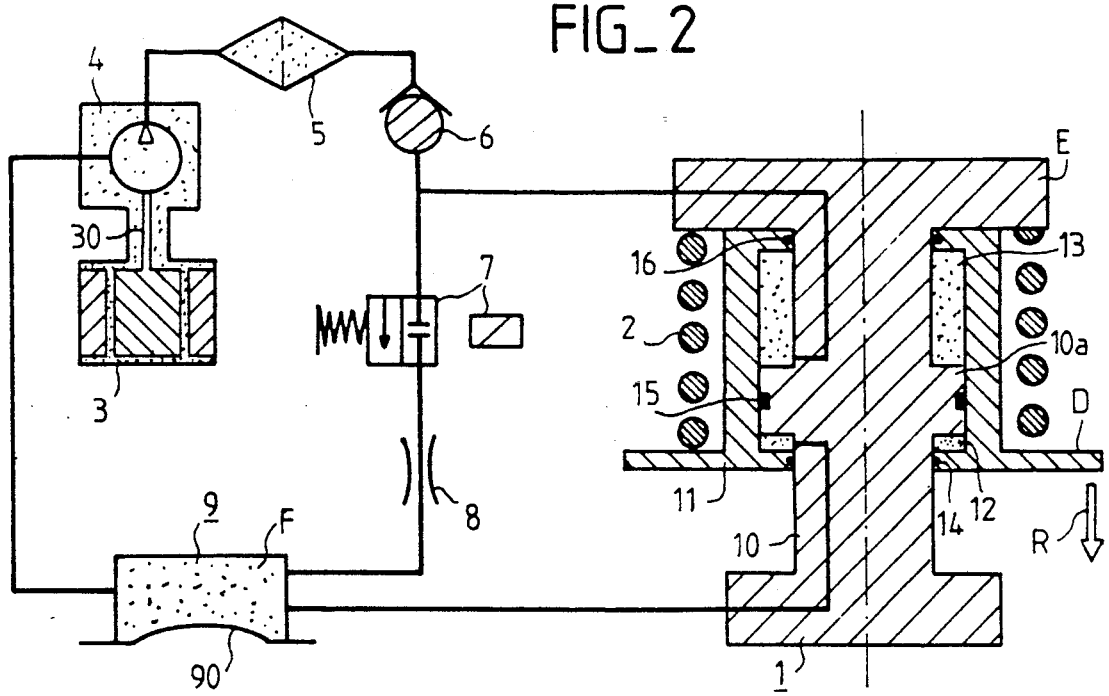
FIG_2

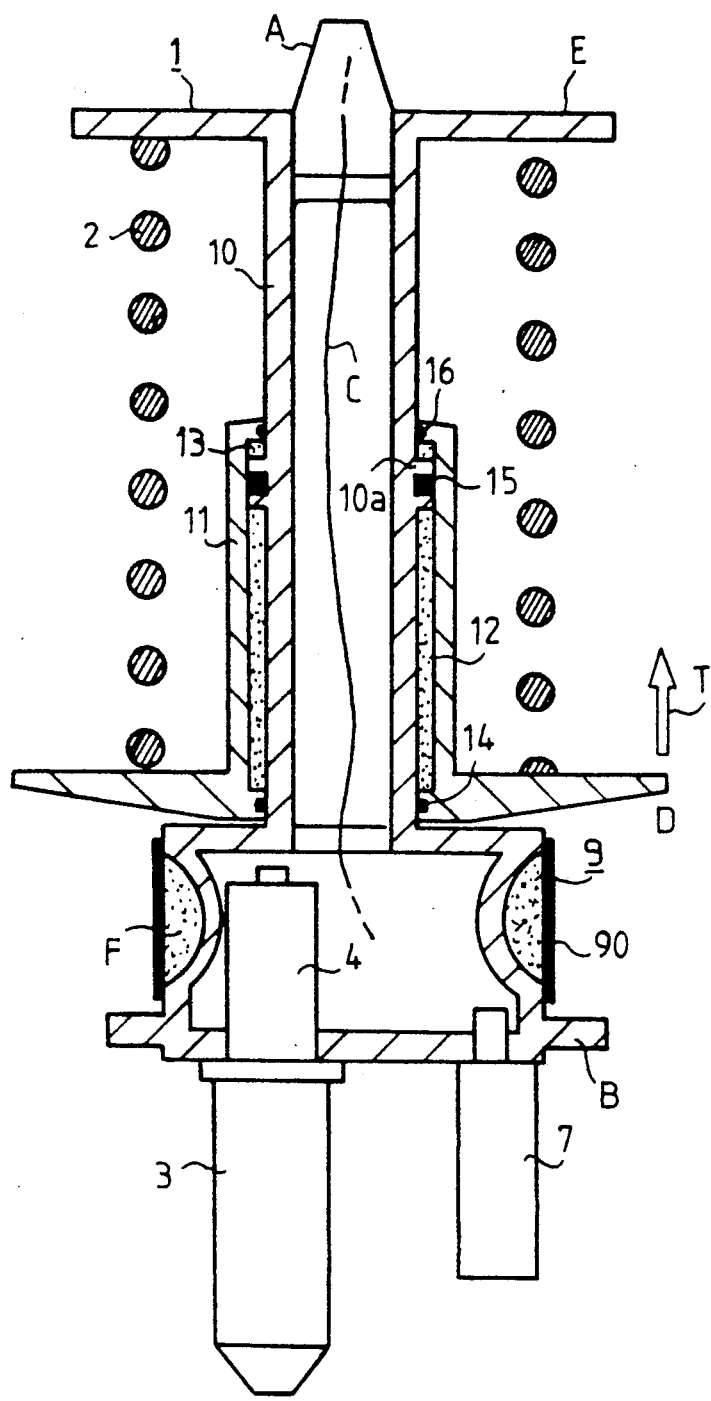
FIG_3

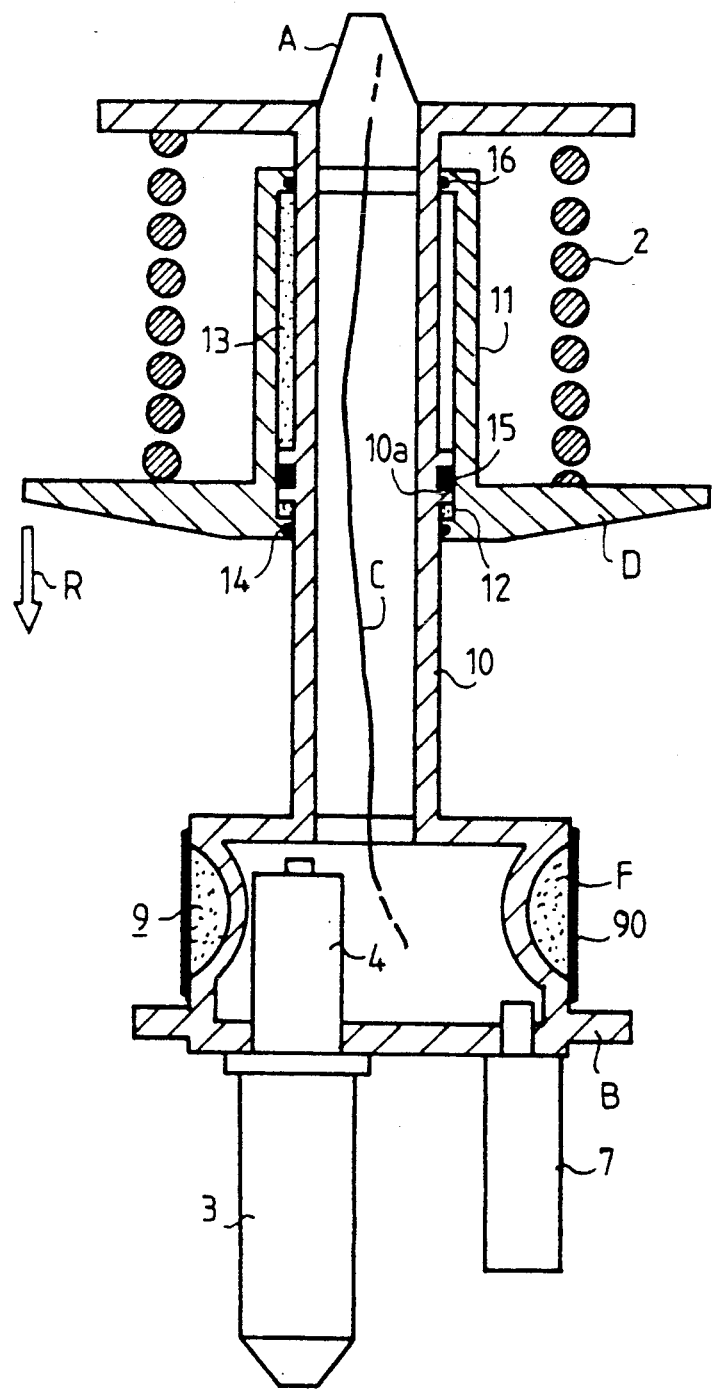
FIG_4

MECHANISM FOR OBTAINING A MOTION OF TRANSLATION IN A MARINE ENVIRONMENT

BACKGROUND OF THE INVENTION

1. Field of the Invention

The present invention concerns a mechanism which can be used, in particular, in a sonar and is designed to be submerged in a marine environment, generally at the end of a cable at depths of several hundreds of meters. The mechanism is designed to give motion of translation of one or more elements of the sonar. This motion is designed to cause one or more hinged arms to pivot between positions substantially at 90 degrees with respect to one another: an "arm down" position and an "arm stretched" position.

2. Description of the Prior Art

There are known mechanisms such as this wherein the motion of translation is given by a nut mounted in a slide and screwed on to threaded rod which forms the shaft of an electrical motor. These known mechanisms have various drawbacks: the revolving joint which is placed around the shaft, at the outlet of the motor power unit, and which is necessary for the imperviousness of the motor, is very difficult to make and greatly brakes the motor. Moreover, the mechanism is generally part of an apparatus which, after having been submerged with the arms in the stretched position, should be raised again to the surface with the arms in the down position, by means of a cable drawn by a winch. Now if a failure in the electrical supply to the motor of the mechanism or a malfunction in this motor occurs during the use of the apparatus, the raising of the apparatus is slowed down by the arms which cannot be lowered in order to be positioned flat against the wall of the body of the apparatus. The arms may even get pulled off during the raising operation.

SUMMARY OF THE INVENTION

It is an aim of the present invention to prevent or, at least, to reduce the above-mentioned drawbacks.

According to the present invention, there is provided a mechanism for obtaining a motion of translation in a marine environment, including a hydraulic circuit comprising a given quantity of fluid, a jack having a pull-back spring, a reservoir filled with a part of the fluid and having an external wall, which is at least partially an equipotential wall, and a pump driven by a motor, the pump and the motor being entirely enclosed in a common enclosure filled with another part of the fluid, the motor actuating the pump to bring the jack to a working position and the spring being positioned to bring the jack from the working position to an idle position. The jack comprising a movable cylinder and a fixed piston having two ends. The two ends of the piston comprising conduits which longitudinally cross said piston and open at both ends of the piston.

BRIEF DESCRIPTION OF THE DRAWINGS

The present invention will be better understood and other characteristics will appear from the following description and from the figures pertaining thereto. Of these figures:

FIGS. 1 and 2 show drawings of a mechanism according to the invention;

FIGS. 3 and 4 show partial drawings of a sonar fitted out with a mechanism according to the invention.

In the different figures, the corresponding elements are designated by the same references.

MORE DETAILED DESCRIPTION

FIG. 1 is a simplified drawing of a mechanism according to the invention. This mechanism has a hydraulic jack 1 with a fixed piston 10 and a movable cylinder 11. The fixed piston has a flange at each of its ends and a ring 10a in its middle. The cylinder 11 is formed by two half-shells assembled around the piston and includes a color D at its lower part. It determines two chambers 12, 13 around the ring 10a. The volumes of these chambers 12, 13 vary according to the position of the cylinder. Two hydraulic conduits open out, respectively, into these two chambers. The conduit opening out into the chamber 13 comes from a hydraulic pump 4 through a filter 5 and a non-return valve 6. The other conduit connects the chamber 12 to a fluid reservoir 9, one wall of which is formed by a flexible membrane 90. Elements 14, 15 and 16 represent seal members which are well known in the related art. The fluid reservoir 9 is directly connected to the pump 4 by a hydraulic circuit. Thus a serial circuit is formed between the chambers 12 and 13. This serial circuit successively has the reservoir 9, the pump 4, the filter 5 and the valve 6. In addition to this circuit, the assembly includes, as a bypass to the conduit connecting the valve 6 to the chamber 13, a third hydraulic conduit which leads to the reservoir 9 in successively passing through a solenoid valve 7 and a restriction 8. It may be recalled that, in hydraulics, a restriction designates a contraction in a conduit, and causes heightened resistance to the flow of the fluid.

A helical spring 2 is placed around the jack, between the upper flange E of the piston 10 and the collar D of the cylinder 11, and tends to make them move away from each other, thus playing the role of a pull-back spring for the jack.

An electrical motor 3, shown in a sectional view and represented schematically by an enclosure containing a rotor surrounded by a stator, actuates the pump 4 by its mechanical shaft 30. The pump/motor assembly is made, as shown in FIG. 1, so that their respective enclosures meet to form only one common enclosure within which the shaft 30 of the motor 3 is entirely enclosed. Thus, the problem of imperviousness of the motor and of the pump with respect to the external environment is simplified since no rotating shaft goes through the wall of the common chamber. For, it is known that when a movable element has to go through a wall and when this wall has to be kept in an impervious condition, efficient imperviousness is difficult to obtain and, through the friction of the seals on the movable element, this imperviousness leads to mechanical losses which can absorb a very high portion of the energy delivered by the motor.

A fluid F, symbolized by surfaces marked with dots, fills the hydraulic circuit that has just been described with the help of FIG. 1. Not only does this fluid fill the enclosure (not shown) in which the solenoid valve 7 is placed, but it also fills the enclosure common to the motor 3 and to the pump 4. With this assembly, inasmuch as the wall of an element of this assembly is at external pressure, it is under equal pressure since the fluid F that it contains is itself also at external pressure through the equipotential wall formed by the membrane 90 of the reservoir 9. Thus the risks of loss of fluid from the hydraulic circuit or of infiltration of a fluid forming the external environment are greatly reduced.

The assembly according to FIG. 1 is shown in an idle position, i.e. with a maximum distance between the flange E of the piston 10 and the collar D of the cylinder 11. The solenoid valve 7 is on and the pump 4 is not actuated by the motor 3. An arrow T, drawn on FIG. 1, shows the direction of the translation that the cylinder must be made to undergo to make the assembly go into the working position.

FIG. 2 shows the mechanism of FIG. 1 but, this time, in working postion. The change from the idle position to the working position is achieved by means of the solenoid valve 7, shut as indicated in FIG. 2 and the pump 4 driven by the motor 3. Under these conditions, the volume of the chamber 13 increases by penetration of the fluid pushed by the pressure of the pump. At the same time, the volume of the chamber 12 decreases by the same quantity, since the cross sections of these two chambers are identical in the example described. The result thereof is an operation at constant volume of the reservoir 9.

The passing of the mechanism into the working position shown in FIG. 2 has compressed the spring which cannot relax, even when the motor 3, controlled by a position detector (not shown in FIGS. 1 and 2) stops actuating the pump 4. In effect, the fluid contained in the chamber 13 cannot escapt therefrom owing to the non-return valve 6 and the shut solenoid valve. It must be noted that the solenoid valve 7 of the mechanism is shut when the excitation coil is powered by a controlling electric current and is opened when there is no current.

With the mechanism in working position, as indicated in FIG. 2, if the coil of the solenoid valve is no longer excited, the energy stored in the spring 2 drives the cylinder 11 in a motion of translation, identified by an arrow R, which brings the jack back to the state indicated in FIG. 1 by transfer of fluid from the chamber 13 to the reservoir 9 through the solenoid valve 7 and the restriction 8 and by transfer of a same quantity from the reservoir 9 towards the chamber 12. Thus, whether the stopping of the supply of current to the coil of the solenoid valve 7 is actuated or whether it is due to a supply failure, the mechanism automatically returns to the idle position, i.e. to the position according to FIG. 1, solely through the energy accumulated by the spring 2. This operation is designed to provide for the safety of the apparatus for which the mechanism described is designed. This apparatus is a sonar, the antennas of which should be capable of being unfolded after submersion at the desired listening depth, and which should be obligatorily folded before the sonar is raised to prevent them from being damaged and, above all, to prevent the raising of the sonar from being slowed down.

FIGS. 3 and 4 are simplified drawings of the mechanism of translation as made for a sonar. These figures, the sole purpose of which is to give an account of the appearance of the mechanism made, show: an electrical cable C, the jack 1 with its pull-back spring 2 and a hooking grip A, a hollow base B placed beneath the jack and acting as a support for the assembly formed by the motor 3 and the pump 4, for the solenoid valve 7 and for the fluid reservoir 9. The fixed piston 10 is hollow and enables the passage of the electrical cable C which connects the different circuits of the submerged sonar to the supply, control and information processing circuits located on a ship or helicopter. Depending on the embodiments concerned, the lifting cables, used to raise and lower the sonar and hooked to the grip A, are formed either by the electrical cable C or by a cable distinct from the cable C.

FIG. 3 corresponds to FIG. 1, that is, it shows the translation mechanism in the idle position while the FIG. 4 shows, like FIG. 2, the mechanism in working position with the spring 2 stretched. All that has been stated on the subject of the operation of the jack/spring assembly according to FIGS. 1 and 2 is also valid for the jack/spring assembly according to FIGS. 3 and 4.

FIGS. 3 and 4 correspond to an embodiment where the travel of the jack is 50 mm between the idle and working positions and where the motor 3 is a DC motor.

It must be noted that the liquid of the hydraulic circuit of the embodiment according to FIGS. 3 and 4 is kerosene. Kerosene is a very fluid product and its physical properties, including its viscosity, are stable under temperature. However, it is not commonly used as a hydraulic circuit fluid because its lubricity is low. Similarly, it is not usual to make a DC motor work in a lubricant liquid because the electrical commutations at the brushes tend to cause electrical arcs through the liquid film that is carried along, and that is why the standard approach lies in the use of an AC three-phase motor but, in the application considered, this approach had to be rejected because of the problems related to a three-phase supply. The use of the highly fluid kerosene enables the above-mentioned drawback of DC motors to be avoided. Its lubricity, which is lower than that of the greases commonly used to lubricate the motors is admittedly the cause of faster wearing out. However, in the application considered, since the motor 3 is made to work only to a very small extent, its lifetime is still long as compared with the expected operating lifetime of the apparatus. In fact, as a rule, the motor is put through one or two working cycles of a few seconds each whenever the sonar is submerged.

The present invention is not restricted to the examples described. It more generally concerns the obtaining of a motion of translation from a jack associated with a pull-back spring and controlled by a pump driven by a motor, the interior of which forms part of the hydraulic circuit of the jack, i.e. it is submerged in the liquid of the hydraulic circuit.

It is thus, for example, that the jack could be one with a fixed cylinder and a movable piston, with the hooking up of the sonar to its lifting cable being then done at the cylinder. The jack may even have only one chamber or it may have two chambers which are not equal. But, then, the fluid reservoir no longer works at constant volume.

Similarly, the non-return valve 6 and the solenoid valve 7, as well as the restriction 8 may be eliminated but, in this case, the motor 3 will have to actuate the pump 4 throughtout the time when the jack has to be kept in a working position and the pump would have to be reversible.

What is claimed is:

1. A mechanism for obtaining a motion of translation in a marine environment, comprising:
 a hydraulic circuit comprising a given quantity of fluid;
 a jack having a pull-back spring, said jack having a working position and an idle position;

a reservoir filled with a part of the fluid and having an external wall which is at least partially and equipotential wall; and a pump driven by a motor, the pump and the motor being entirely enclosed in a common enclosure filled with another part of the fluid;

said motor actuating said pump to bring said jack to said working position and said pull-back spring being positioned so as to bring said jack from said working position to said idle position; wherein said jack comprises a movable cylinder and a fixed piston having two ends, said two ends of said piston comprising conduits which longitudinally cross said piston and open at both ends of said piston.

2. A mechanism according to claim 1, wherein the jack is one with two chambers of equal dimensions, so that the reservoir contains a constant volume of fluid.

3. A mechanism according to claim 1, wherein the motor is a DC motor and the fluid is kerosene.

* * * * *